(No Model.)  9 Sheets—Sheet 2.

H. L. REINHARDT.
GLASS MOLD.

No. 605,133. Patented June 7, 1898.

Fig. 2

WITNESSES:

INVENTOR

BY

ATTORNEY.

(No Model.)

H. L. REINHARDT.
GLASS MOLD.

No. 605,133.

Patented June 7, 1898.

(No Model.)  9 Sheets—Sheet 4.

H. L. REINHARDT.
GLASS MOLD.

No. 605,133. Patented June 7, 1898.

Fig. 4.

WITNESSES: INVENTOR
Henry L. Reinhardt
BY
ATTORNEY.

(No Model.)  
H. L. REINHARDT.  
GLASS MOLD.  
No. 605,133. Patented June 7, 1898.

WITNESSES:  
Harry S. Rohrer  
N. T. Menchine

INVENTOR  
Henry L. Reinhardt  
BY  
N. M. Sterling  
ATTORNEY.

(No Model.)

H. L. REINHARDT.
GLASS MOLD.

No. 605,133.

Patented June 7, 1898.

WITNESSES:
Harry S. Rohrer
W. T. Hawkins

INVENTOR
Henry L. Reinhardt
BY
W. M. Sterling
ATTORNEY.

(No Model.)

H. L. REINHARDT.
GLASS MOLD.

No. 605,133.

Patented June 7, 1898.

WITNESSES:

INVENTOR
Henry L. Reinhardt
BY
ATTORNEY.

(No Model.)

H. L. REINHARDT.
GLASS MOLD.

No. 605,133.

Patented June 7, 1898.

WITNESSES:

INVENTOR
Henry L. Reinhardt
BY
ATTORNEY.

UNITED STATES PATENT OFFICE.

HENRY L. REINHARDT, OF WHEELING, WEST VIRGINIA.

GLASS-MOLD.

SPECIFICATION forming part of Letters Patent No. 605,133, dated June 7, 1898.

Application filed March 18, 1897. Serial No. 628,163. (No model.)

*To all whom it may concern:*

Be it known that I, HENRY L. REINHARDT, a citizen of the United States, and a resident of Wheeling, in the county of Ohio and State of West Virginia, have invented certain new and useful Improvements in Glass-Molds, of which the following is a full, clear, and exact description.

The invention herein described has special reference to mechanically-operated glass-molds and to the mechanism for mechanically blowing the glass, it being the object of the improvements comprising the invention to construct a machine which will perform the operation of blowing and molding the glass in an efficient and thoroughly practical manner.

As mechanism for performing the several operations necessary to blow and mold the molten glass have been combined heretofore, the present invention is directed more particularly to the construction of the several elements of the machine herein shown and the manner in which they automatically cooperate to secure efficiency of mechanical performance of the operations, which are as yet accomplished by skilled labor. The several operations required being the opening and closing of the mold, the cooling of the same after the removal of the molded article, supporting the blowpipe in operative position to the mold and the compressed air or supply for mechanically blowing the glass, and the rotation of the blowpipe during the process of blowing, the invention consists in the novel construction and arrangement of parts by which these operations are performed, all of which will be hereinafter fully described, and set forth in the claims.

In the accompanying drawings.

The base of the machine is a truck 1, which in the present instance is preferably constructed so that the bottom of the water-pan 2, in which the mold-sections 3 and 4 are dipped during the operation of the machine, whereby to cool them, will form the major part of said base, while a rear extension 5 is provided with sockets 6, 7, and 8, in which are firmly fitted the standards 9 10 11, respectively. These standards form the main supporting-framework of the machine.

The mold-sections 3 and 4 are independent of each other and are supported and operated by their respective arms 12 and 13, which are pivotally mounted upon a journal 14, projecting in a horizontal plane from the rear wall of the water-pan. The pan while in general outline rectangular is formed with a depression 15 in its rear wall, in which depression or recess the arms 12 and 13 have their movement and permit their bent ends, carrying the mold-sections, to straddle the edge of the side walls 16 of the said recess 15 and dip the mold-sections in the water without wetting other parts of the machine. By this form of pan the advantage is obtained of having a large body of water which not being divided will be of uniform temperature and will not subject the mold-sections to an unequal cooling, as would be the liability were two separate receptacles employed.

Figure 4:
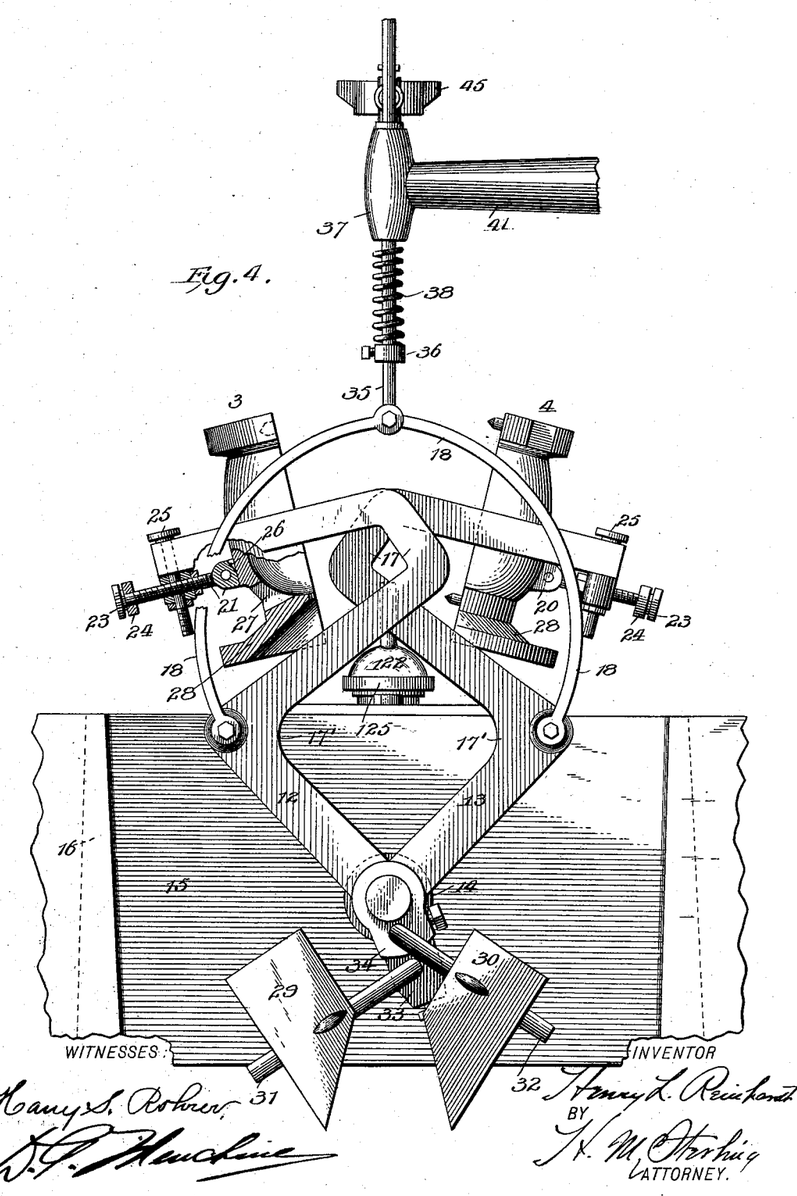
Fig. 4 is an enlarged rear view of the section or mold and its operating mechanism, the position in which it is shown being that in which it receives the gathering of plastic glass previous to closing about the same.
Figures 5, 6:
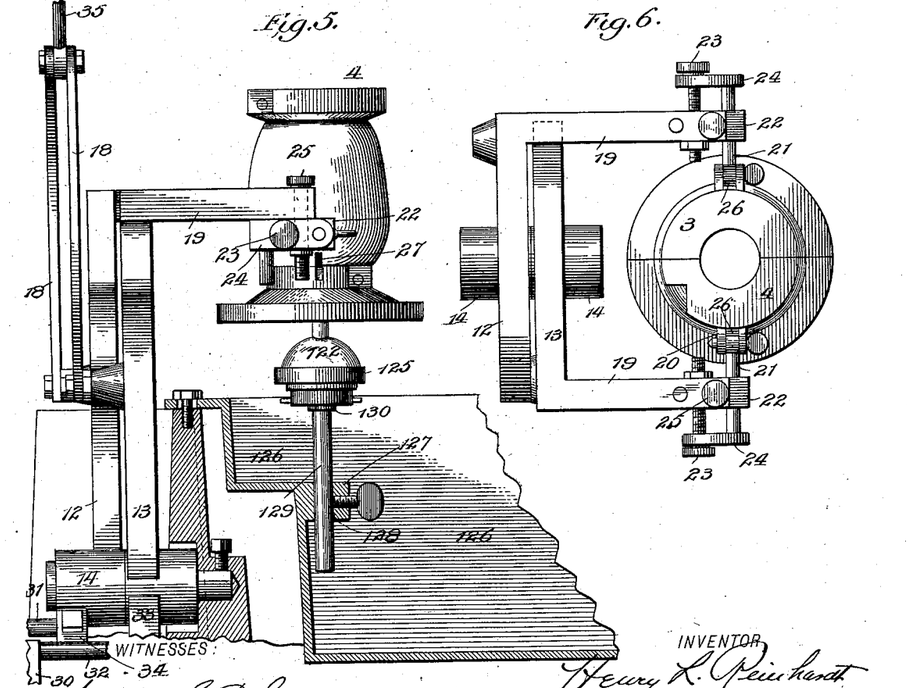
Fig. 5 is an end view of the mold and its operating mechanism, shown in the position occupied when the mold is closed.
Fig. 6 is a top or plan view of the closed mold and the arms on which the mold is supported.

By reference to Figs. 4, 5, and 6 it will be seen that the mold-operating arms are arranged on the journal 14 so that they will move in separate vertical planes. These arms for their major part are approximately in the form of an S, making two prominent bends, the upper bend 17 forming a hook which will allow its end to dip well down into the pan and the lower bend 17' forming an elbow to which is pivotally secured the spring-yoke 18 for normally exerting a pressure to close the mold-sections and forming one of the means by which the arms are operated, as will more fully hereinafter appear.

Figures 18, 19, 20, 21, 22, 23, 24, 25, 26:
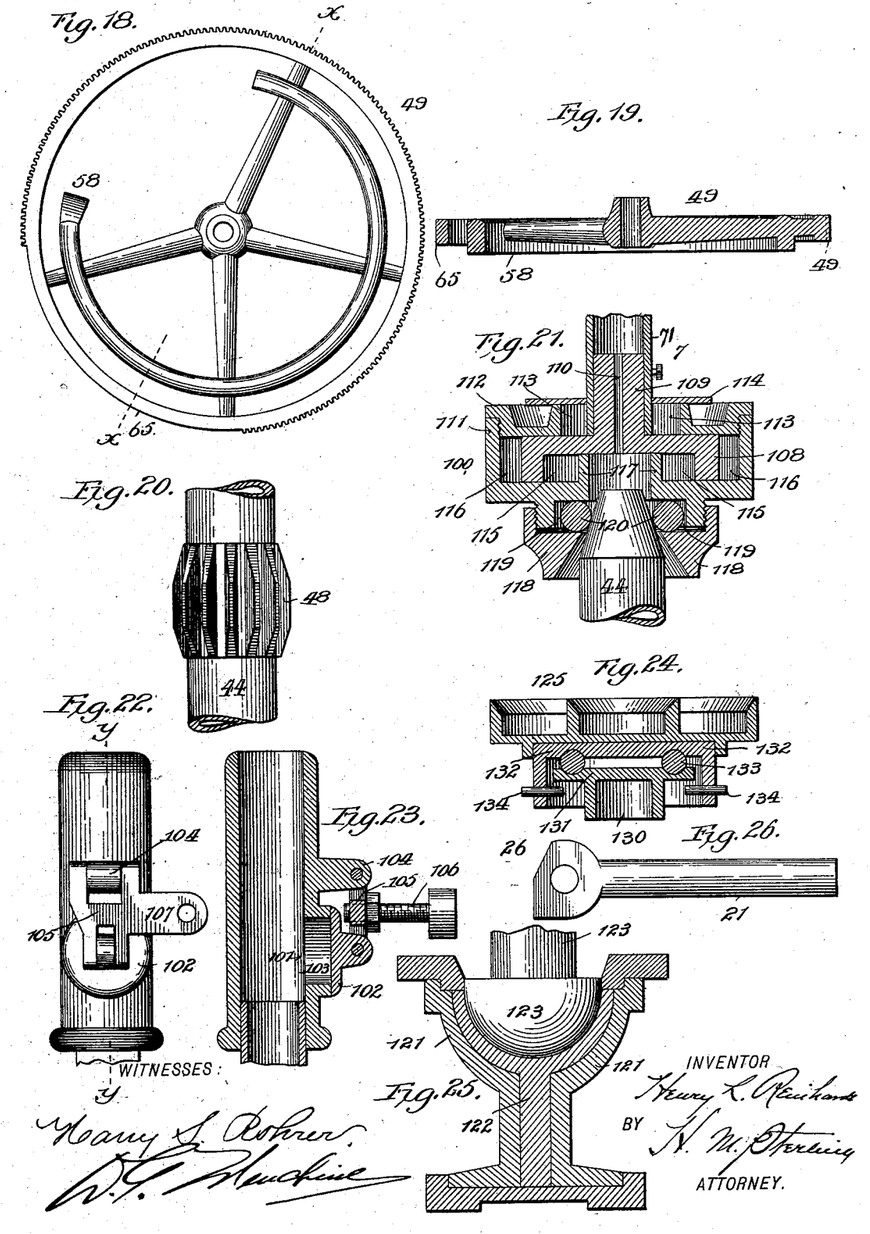
Fig. 18 is a top view of a mutilated gear-wheel for rotating the blowpipe, upon which wheel is a cam-track for engaging the mechanism by which the mold-sections are operated.
Fig. 19 is a sectional view of the mutilated gear-wheel, taken on the line $x$ $x$ of Fig. 18.
Fig. 20 is a view showing a section of the blowpipe, disclosing the pinion mounted thereon for engagement with the mutilated gear.
Fig. 21 is a vertical sectional view of the coupling, by which the end of the blowpipe is connected with the air-pipe.
Fig. 22 is a detail view of a pressure-regulating valve with which the air-pipe is provided.
Fig. 23 is a vertical sectional view taken on the line $y$ $y$ of Fig. 22.
Fig. 24 is a sectional view of a rotatable foot-rest designed for use when articles requiring the foot are formed.
Fig. 25 is a sectional view of a mold for forming a foot.
Fig. 26 is a view of one of the arms upon which the mold-sections are mounted to permit the section to tilt to a level when lowered into the water-pan for cooling and back again when raising.

The arms 12 and 13 have each a horizontal extension 19, formed at right angles to the plane in which they move. These extensions form the direct means of support for the mold-sections, bringing them directly over the body of water, and upon the ends of the said extensions are pivotally mounted these mold-sections, but through the intervening agency of an adjustable connection, for the purpose of insuring the perfect and uniform contacting of the two inner faces of the section and for the adaptation of the machine to the use of molds of various forms and sizes. To secure this adjustability and properly suspend the mold-sections so that they may seek the perpendicular position when raised and a tilted position when submerged in the water, each mold-section has cast thereon, intermediate its top and base, an ear or lug 20, to which is pivotally secured a connecting member 21, which is adjustably held in a block 22 by means of the set-screw 23, entering an extension-head 24 of said member 21 and working within the block 22, which said block is in turn adjustably secured to the extension 19 of the operating-arms by means of set-screws 25 and is vertically movable on a pin for holding the same in place. It will therefore be seen that horizontal adjustment is effected by the screw 23, while by means of screw 25 vertical adjustment is accomplished, and that thus the machine is capable of being used with molds of various forms and sizes. In Fig. 26 is shown the connecting member 21, and it will be seen by reference thereto that the hinged end of said member, while adapted to contact with the mold-section to which it is secured and present thereto a parallel contacting surface, so that a stop will be formed thereby to prevent the mold-section from tilting forward when approaching its perpendicular position, is also beveled at 26 to allow the section to tilt when entering the water, thereby to bring the mold more readily below the surface thereof. Upon leaving the cooling-pan the mold-section is drained by means of the aperture 27, located at a point where water would accumulate within the section. Further, there has been provided an outwardly-flared base which forms a shed 28 for directing any drainage away from the part supported below the sections when in their raised position. It will be also understood that the heating of the molds from the molten glass causes them to dry quickly if drained of all water upon leaving the cooling-pan.

Counterbalance-weights 29 and 30 are respectively provided the arms 12 and 13 and are slidingly adjustable upon arms 31 and 32, respectively secured to the extensions 33 and 34 of the mold-operating arms. These weights are adjusted by set-screws. Thus the mold-sections, being nicely balanced, are raised and lowered by the application of very little power.

The rod 35, by which the mold-sections are raised and lowered through the spring-yoke 18, is provided with a collar 36, between which and the bearing 37, in which said rod reciprocates, is a coiled spring 38, which, being compressed while said rod is raised, exerts the necessary force to give the power required to open the mold, and particularly to such a point as will allow it to be gravity-actuated for a continued movement of said mold-sections to their submerged position. The raising of the mold-sections from the water into a position to receive the gathering of glass is accomplished by direct power applied to the rod 35 by means of mechanism which will be hereinafter referred to.

Figure 1:
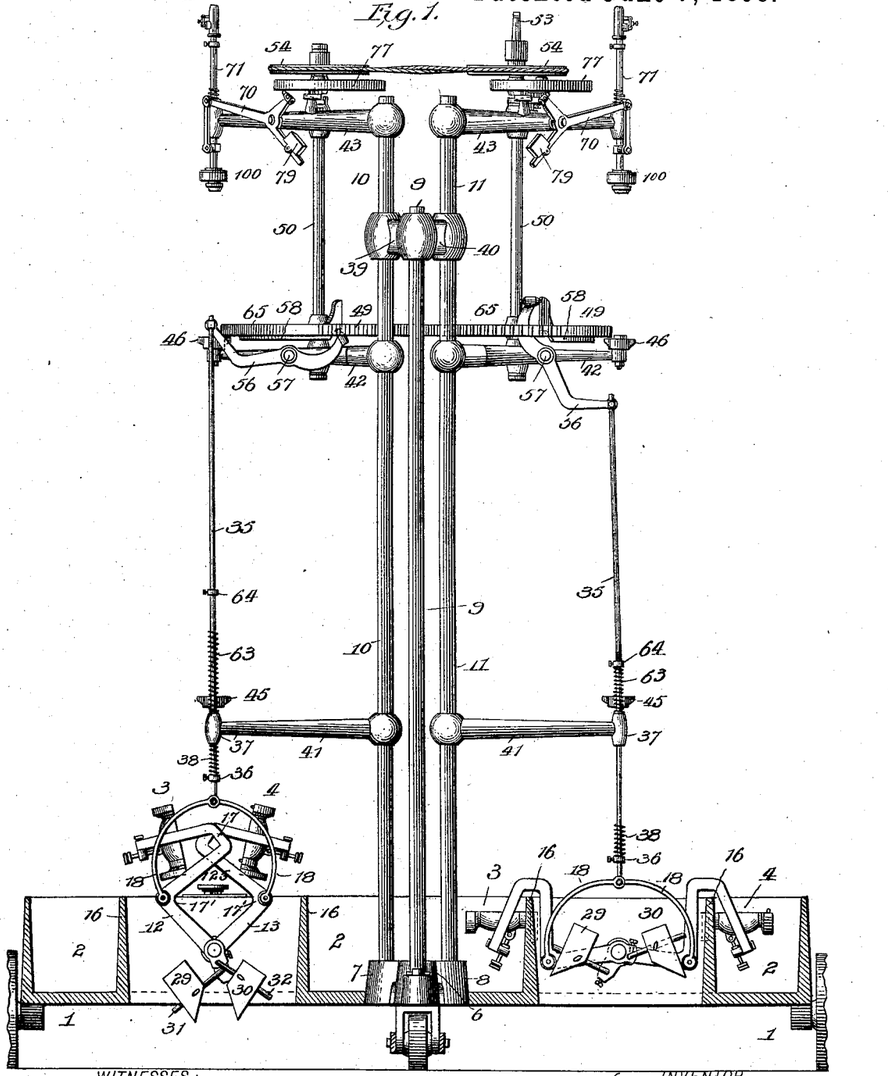
Figure 1 is an elevation of the glass-molding machine as seen from the rear and in which view the water-receptacle is shown in section, disclosing one of the molds in its submerged position therein.
Figure 2:
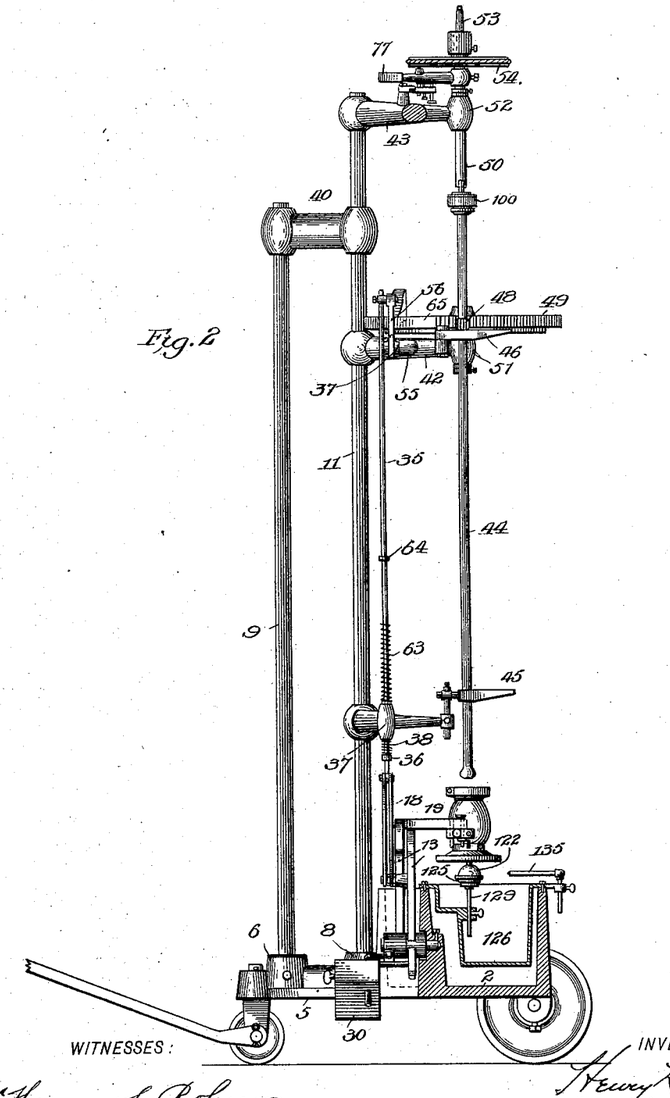
Fig. 2 is a side elevation of the machine, showing only the right-hand side thereof, which in itself is a complete machine, and in this view the mold is shown in its closed position.
Figure 3:
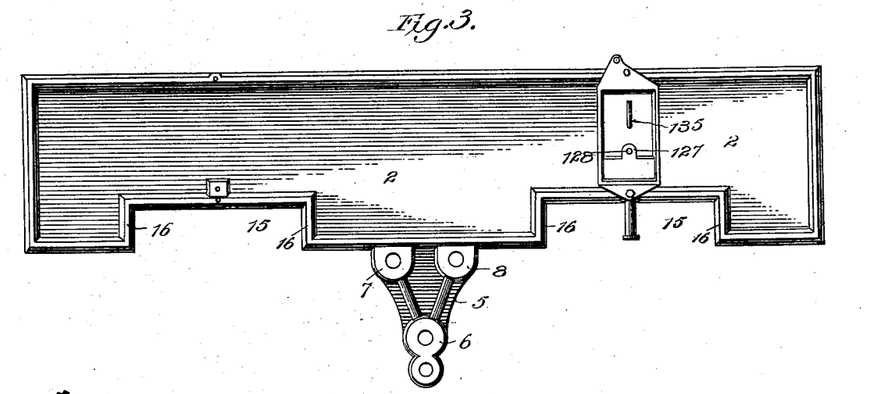
Fig. 3 is a top or plan view of the water-receptacle and a base-support for the standard of the machine.

As it is desirable to have two independently-operated molds, the machine has been shown in Fig. 1 in this preferred form, in which construction the standard 9 forms a support for the upper portion of standards 10 and 11, which are firmly secured thereto by horizontal braces 39 and 40. In referring to mechanism mounted upon these last-named standards the same reference-numerals apply to the like corresponding parts, though, as seen by Fig. 1, the two machines or parts thereof are represented in different stages of operation.

There are three horizontal arms 41, 42, and 43, mounted upon each of the standards 10 and 11, which form the support for the driven shaft and the mechanism operated by said shaft, and these are arranged at suitable heights one above the other and project forward over the mold. The lower arm 41 is arranged in close proximity to the mold, its main function being to form a support for the lower portion of the blowpipe 44, which is mechanically held and rotated above the mold, while from its angular form it furnishes an additional function in giving a guiding-support to the rod 35 by offering a bearing 37 at the elbow. At the end of said arm 41 is provided a forked guide 45 to receive the blowpipe, which guide is suitably adjustable on the said arm. A similar forked guide 46 is provided the intermediate arm 42 to receive and hold the upper end of the blowpipe, and it will be seen that the slot 47 of the forks or guide is of a width sufficient to admit the blowpipe, so that it will be firmly held within the same and of a length to allow movement of the blowpipe in order to bring the pinion mounted thereon into engagement with the mutilated gear for rotating said pipe and for the further movement of the blowpipe after such engagement as will impart an initial movement to the gear, and thus operate to throw the machine into operation by automatically operating the clutch mechanism, to be hereinafter fully described. The slot 47 is outwardly flared to more readily receive and guide the blowpipe when being inserted. The upper fork or guide forms the main support of the blowpipe against vertical displacement and offers a bearing on its upper face to the hub or bearing portion of the pinion of the blowpipe. By reference to Fig. 20 the pinion 48 will be seen to be beveled at each end, whereby the shoulder or bearing end is reduced to allow the hand of the attendant to readily pass over the same without meeting any obstructing angles which would tend to hinder the manipulations or be disagreeable or hurtful to the hand of the manipulator.

The blowpipe is rotated by means of the mutilated gear-wheel 49, rigidly mounted on the driven shaft 50 by engagement with the pinion 48 and as a result of certain automatic operations.

The shaft 50 turns in suitable bearings 51 and 52, provided on the arms 42 and 43, respectively, and is driven from a flexible shaft (not shown) which is adapted to be connected to a spindle 53, turning a pulley 54, loosely mounted on said shaft 50, and forming an element of a clutch mechanism, whereby motion is imparted to said shaft and the operating parts carried by it for automatically securing the several operations of the machine and in the order of performance most desirable. The means for closing the mold and rotating the blowpipe are confined to the arm 42 as their fundamental support, and to these features of invention reference will now be made specifically and for illustration of which attention will be directed particularly to Figs. 7, 9, 11, 18, and 19.

The support 42 is provided with a lug 55, which furnishes a mounting for a rocking arm or lever 56, having its fulcrum at the pivot 57, and to one end of which rocking arm is pivotally secured the upper extremity of rod 35, while its other end is adapted to engage a cam 58, carried by the wheel 49. This cam is in the form of a circular track extending nearly around the wheel, but within the rim thereof. As the cam is designed to impart first an upward movement to the rod 35 sufficient to bring the molds in position to receive the gathering of glass and there to remain until an initial movement is given the wheel 49 by the insertion of the blowpipe, the cam begins in an upwardly-projecting abutment 59, which presents a vertical engaging face to the adjustable contact-pin 60 of the lever 56, so that as the wheel turns the abutment 59 advances it will force down the engaging end of said lever and raise that end to which is connected the rod 35, operating the mold-sections. This movement brings the mold-sections into a position in which the machine stops, the stopping being automatically regulated by other mechanism, and a shoulder 61, having a face lying in a horizontal plane, forms a catch whereby the mold-sections are held against movement, as not until the further movement is given the wheel 49 to bring the pin 60 past this point and onto the inclined portion 62 of the cam will there be a further movement of the lever 56 or of the mold-sections in consequence of its connection thereto; but as the inclined portion 62 advances the mold-sections are brought together and with greater force than by the previous movement. The mold having been closed by this action of the cam, it is held in that position by the circular-track portion of said cam as its engaging face lies in a horizontal plane (see Fig. 9) and for a duration which is determined by the length of track and speed at which the machine is operated. The engaging pin 60 having reached the end of the track, the arm is free to raise and to remain raised, and does so, being actuated by the spring 38, heretofore referred to, which action causes the rod 35 to descend, the mold to open, and the sections thereof to be dipped into the water-pan while the molded article, together with the blowpipe, is being removed.

To provide against a too-sudden stopping of the mold-sections when they have reached their lowest point in the water-receptacle and to prevent any sudden contact of the mold-carrying arms with the edge of the pan, a spring 63 is provided to cushion on a stop or collar 64, rigidly fastened about midway of the rod 35.

While the mold is being operated as a result of the movements above described, the gear-wheel 49 has also been rotating the blow-pipe until the mold is opened, and during the time taken by the molds in opening, dipping, and returning to the position shown in Fig. 4 there is no rotation of said blowpipe, as the mutilated section 65 of the gear has been reached by the pinion 48 and permits the wheel to turn for an interval without imparting any movement thereto.

Figure 7:
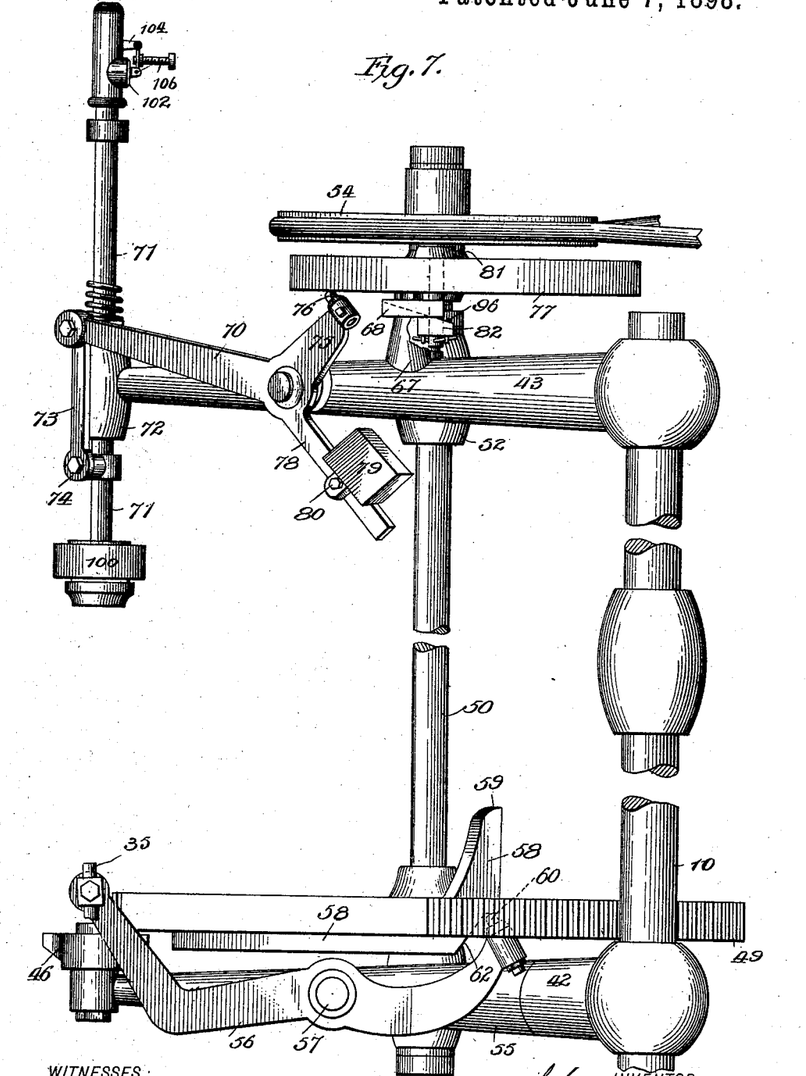
Fig. 7 is an enlarged view, in side elevation, of the upper part of the machine, comprising the supports for the blowpipe and the mechanism for operating the same in conjunction with the mold.
Figure 8:
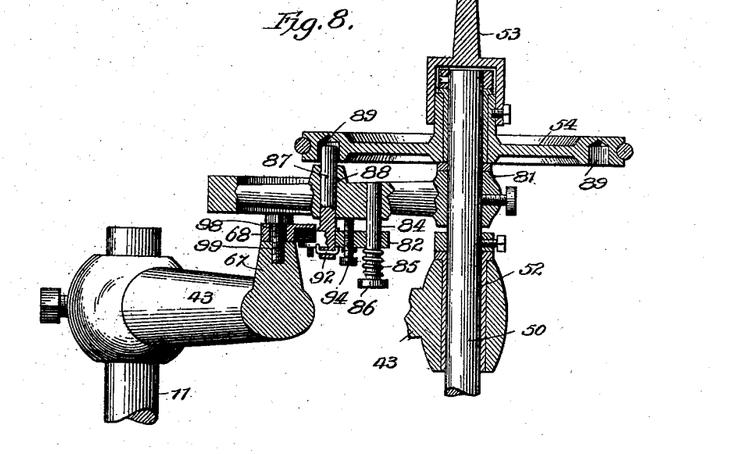
Fig. 8 is a detail view, shown mostly in section, of the clutch mechanism, which is thrown into engagement with a constantly-driven shaft or pulley by the introduction of the blowpipe.
Figure 9:
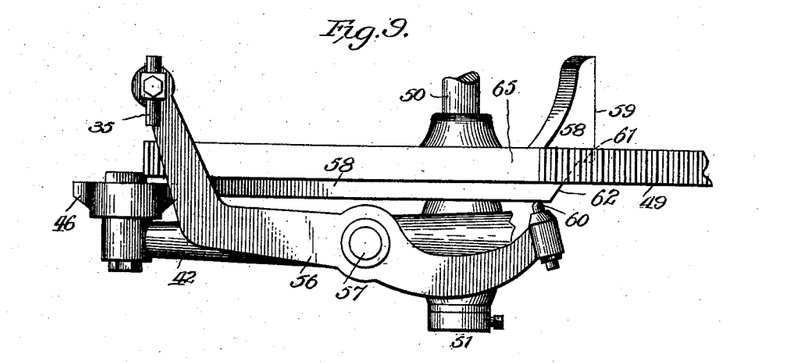
Fig. 9 is a detail view of the mechanism for periodically operating the mold-section and for imparting a rotary movement to the blowpipe.
Figure 10:
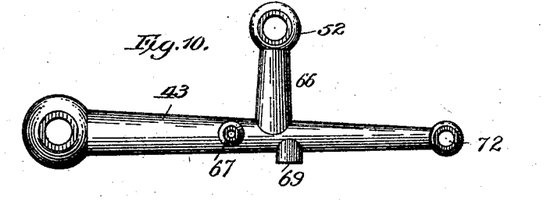
Fig. 10 is a plan view of the upper supporting-arm, in which is mounted the upper portion of the shaft carrying the clutch mechanism and also the air-pipe.
Figures 11, 12, 13, 14, 15, 16, 17:
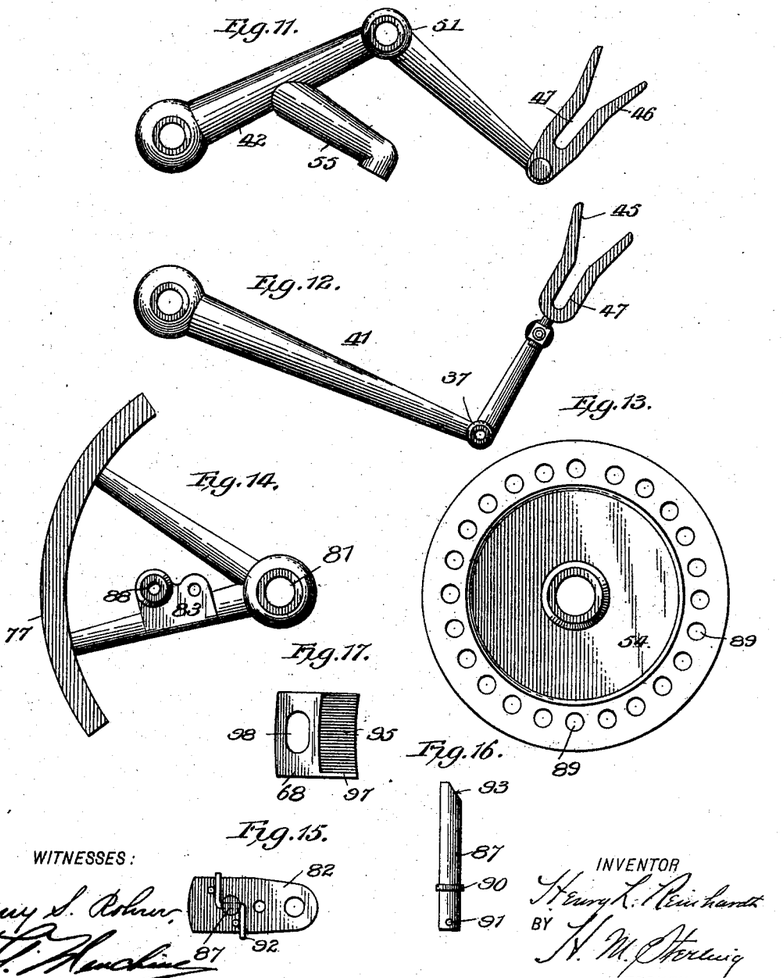
Fig. 11 is a plan view of the intermediate arm, which furnishes a support and bearing for the lower end of the main operating-shaft, and its mechanism for rotating the blowpipe and operating the mold-sections, while at its end is provided a forked guide which receives and supports the blowpipe.
Fig. 12 is a plan view of the lower arm, which provides a bearing for the mold-operating rod and upon which is supported at its outer end a forked guide to receive the blowpipe, as in Fig. 11.
Fig. 13 is a bottom view of the constantly-driven pulley, which is loosely mounted on the main operating-shaft of the machine.
Fig. 14 is a plan view of the segment, which turns with the main shaft of the machine, designed to operate through part of the revolution of the shaft upon mechanism for raising the air-pipe and upon which segment is carried the clutch mechanism.
Fig. 15 is a bottom view of a portion of the clutch mechanism, this mechanism comprising an adjustable spring-actuated block carrying a pin or bolt, which block in turn is carried by the segment shown in Fig. 14.
Fig. 16 is a detail view of the locking-pin of the clutch mechanism.
Fig. 17 is an adjustable abutment having an inclined or cam face and is mounted upon a projection upon the upper arm and in the path of the sliding block of the clutch mechanism, being adapted by engagement therewith to force said sliding block down against its spring-pressure, thereby withdrawing the bolt.

In referring to that part of the machine comprising the air-conduit and the clutch mechanism attention will be directed to the enlarged views thereof shown in Figs. 7 and 8 and the details shown in Figs. 10, 13, 14, 15, 16, and 17.

The main support of the above-mentioned parts is found in the arm 43, which is provided at one side with a laterally-projecting arm 66, having a vertical opening 52 formed in its end to receive the shaft 50, a lug or support 67 on its top for a stationary trip-block or abutment 68, having a cam-face which acts upon the clutch mechanism to release the same at a proper point in the machine's operation, and a lateral lug or support 69, formed on its opposite side, to which is pivotally secured a rocking lever 70, by which the air-pipe 71 is lowered onto the blowpipe and raised therefrom as the result of certain automatic movements imparted to said lever. The air-pipe is held and guided in its reciprocatory movement by the vertical bearing 72, formed on the end of the support 43. The said air-pipe is secured to the outer member of the rocking lever 70 through a link connection 73, the said connection being a rod pivotally connected at one end to the lever-arm and at the other end to the air-pipe below the bearing 72 and at point 74. The short arm 75 of the lever is upwardly inclined and is the operated arm for raising the air-pipe off the blowpipe, and is therefore provided with an adjustable pin 76, which is engaged by the segment 77, carried by the shaft 50 and by which the said operated arm is forced down against the normal pressure exerted to raise it by the weight of the air-pipe. To equalize the weight of the air-pipe and its parts, a counterbalance-arm 78 is formed on the lever 70 and provided with a weight 79, adjustable thereon and held in adjusted position by a set-screw 80.

To prevent the air-conduit from descending with a jar, as would result were the blowpipe not in place, it has been provided with a collar and spring, after the manner of rod 35.

The segment 77 for reciprocating the air-pipe is rigidly mounted on the shaft 50, and its hub 81 forms a bearing for the driven pulley 54, which, as before mentioned, is loosely mounted on said shaft. This segment has a cam function and operates upon the pin 76 in substantially the same manner as the cam of the gear 49 acts upon the pin 61, its first movement being to trip the lever and raise the air-pipe thereby, then holding the same tripped while the under side of the segment is passing over the depressed arm of the lever. This action is measured by about one-fourth of the time taken for a complete revolution of the shaft, while for the remaining three-fourths of the revolution the said pipe is in its lowered and engaged position on the blowpipe. This segment is so located with reference to other parts of the machine that its action will be to hold the lever normally engaged, as shown in Figs. 1 and 7, so that slightly succeeding the closing of the mold about the gathering of glass the air-pipe is lowered and the blowing commenced, and slightly previous to the opening of the mold it will be raised, thereby cutting off the air-pressure. Immediately preceding the coupling of the blowpipe with the air-pipe the rotating of the blowpipe commences, and immediately succeeding the uncoupling the rotation ceases, and all by virtue of the relative arrangement of the several parts.

The clutch mechanism is carried by the segment 77 and comprises a vertically-movable block 82, secured thereto below said segment at point 83 by means of a vertical rod 84, upon which said block 82 is adapted to slide, but is normally held in a raised position by coil-spring 85, interposed between said block and a stop or head 86 at one end of the rod. The sliding block 82 carries a pin or bolt 87, which projects through an opening 88 in one of the radial arms of the segment and into one of the recesses 89 of the constantly-driven pulley 54, thus locking the segment and pulley and causing rotation of the shaft 50. The pin 87 is loosely fitted in the sliding block and is provided with a boss 90, Fig. 16, which limits its downward-sliding movement in the block, and also a transverse opening 91, in which is located a spring 92. This spring receives its tension when the block 82 is being forced down against the pressure of the spring 85, and by reason of the tendency of the pin 87 to remain in the openings 89 through friction, the overcoming of which gives tension to said spring, which immediately upon the withdrawal of the pin 87 exerts its pressure to pull the pin down and free from all engagement with the pulley. The pin is beveled at 93 to more readily engage the openings 89 of the pulley, and the vertical movement of the pin and block carrying the same is regulated by a set-screw 94.

Reference has been made to the fact that the block 82 is operated upon by the abutment 68, which is located in its path. This abutment presents on its under side an inclined face 95, which is adapted to engage a similar inclined face 96 on the upper side of the block 82, and as the abutment is rigidly mounted in the same plane in which the said pin-block travels the action of the engaging inclined faces is to force the pin-block down in passing the abutment. The engaged position is that in which the machine is normally held, and in that position the initial movement is given by the attendant in inserting the blowpipe, which initial movement is sufficient to release the block 82 from the horizontal face 97 of the abutment and throw the clutch mechanism into engagement with the constantly-driven pulley. When one revolution of the shafts is made, this engaged position is again brought about, thus bringing the machine to a rest for the removal of the blowpipe and the insertion of another for the next molding, and in this position of rest the machine will remain until a blowpipe is newly inserted.

For the purposes of adjustment the abutment 68 is provided with a slot 98, through which the set-screw 99 passes and engages a screw-threaded socket in the lug or support 67. The compressed air for blowing the glass is supplied from any suitable source and introduced into the reciprocating air-pipe 71 of the machine at its upper end. The pressure necessary for blowing being slight is permitted to escape at all times through the coupling 100, which receives the upper end of the blowpipe, and to provide against a too-strong pressure, as well as to permit a regulation thereof and an outlet for the escape of air when, by reason of the completion of each blowing process, the tendency would be to increase the pressure beyond a predetermined point, a regulating outlet-valve 101 is provided. The valve comprises, as will be seen by reference to Figs. 22 and 23, a disk 102, suspended in front of an opening 103 from a lug 104 and by means of an intermediate support 105 pivotally connected at one end with the said lug and at its other end with an ear or lug formed on the valve-disk, and a weighted arm 106 in the form of a bolt with screw-threads, which is adjustable in the pivoted support 105 and works in a lateral projection 107 thereon, which permits the arm 106 to extend at one side of the air-pipe, as it may be necessary in adjusting the same to lessen the leverage thereof.

In Fig. 21 is shown a vertical sectional view of the coupling carried on the end of the air-pipe, and reference will now be made to the details of the construction therein shown, the importance of which will be appreciated when it is understood that beside the need of making an effectual coupling as regards the introduction of air into the blowpipe it is necessary to provide for lateral movement, thus rendering the coupling in a measure flexible, as a bent blowpipe would not be desirable for manipulation in the machine without provision being made therefor. To this end the present coupling has been designed.

To the end of the air-pipe 71 is fitted a flanged disk 108, having a central stem 109 fitted within the bore of the air-pipe and through which disk and stem is formed a small air-passage 110. This disk 108 is surrounded by a circular inclosure 111 and forms a slide for the plate 112 of said inclosure, while the circular flanges of the disk 108 perform a like function in bearing against the bottom of the inclosure, the said flanges also forming a stop for limiting the horizontal movement of the coupling by engagement with the outer wall of the movable inclosing part 111. A circular opening 113 is formed in the center of plate 112 to admit the end of the air-conduit and also provide for the necessary play required by the lateral movement of the coupling. Over the opening 113 and snugly fitting about the air-pipe is a cap 114, adapted to keep out the dust. The spaces 115 and 116 on each side of the flanged disk 108 give the necessary movement in any direction within a horizontal plane. In providing the space 116 it will be seen that the engagement of the flange of disk 108 with the outer wall of the inclosing sliding portion limits the movement in any direction in which it may move, and the said flange being nearer this wall than the inner wall 117 the space on the inner side of the flanged disk 108 will only be partially taken up by the movement of the coupling, leaving thereby room for holding a quantity of oil for lubricating the wearing parts of the coupling. This inner flange 117, bearing on the under face of the disk, prevents any oil from dropping onto the blowpipe. Upon the under side of the movable portion of the coupling is a screw-threaded flange, to which is screwed the inwardly-tapering mouthpiece 118, which forms, in conjunction with the part to which it is secured, an interior circular recess 119, in which is securely held a rubber ring 120, which offers an expansible opening for the tapered end of the blowpipe, and by reason of its contraction about the inserted end of the pipe prevents the escape of air except through the pipe.

In the making of articles having a foot, such as goblets, the foot and stem is formed in any desirable mode, as shown in Fig. 25, in which 121 indicates the mold, 122 the stem and foot of glass formed therein, and 123 the plunger. The stem and foot 122 is then placed on a suitable rest 125, supported below the mold in which the bowl of the goblet is blown. There being contact between the two bodies of glass and that in the mold being in a state of rotation, the stem and foot also is rotated. To secure the best results in a mechanically-operated mold the foot-rest 125, Fig. 24, is supported on ball-bearings, which permit the rest to rotate with the foot and prevent it from offering any resistance thereto. The rest is mounted within the water-tight box 126, which is supported on the edge or walls of the water-pan and extends down into the water. A lug or support 127 is formed on one side of the box and in its interior, and within the bearing 128 in said lug is adjustably secured the rod 129, which supports the rest. The upper end of the rod 129 fits within a socket 130 of the bearing-plate 131. Over this plate is placed the rotatable cap 132, but supported directly on the ball-bearings 133, which travel in a circular groove formed in the said bearing-plate and the under face of the cap. The cap 132 is held against displacement by pins 134, which extend through a downwardly-projecting flange of said cap and below the bearing-plate.

The foot-rest 125 is preferably formed as shown in Fig. 24, with an inner and an outer flange for retaining the foot of the tumbler and at the same time adapting it for use within certain limits on various sizes of feet. The rest is also made to fit upon the cap 132 and to be readily removable therefrom, as occasion may require.

In conjunction with the foot-rest is provided an adjustable heating device 135 for directing a flame upon the foot to keep it from cooling too rapidly while the bowl is being formed, in which operation the previously-formed foot is being connected to the forming bowl. In addition to keeping the foot heated it is desirable that the rest be also kept at a high temperature, and this is also accomplished by the heater. The heating device consists of a gas-conduit adjustably mounted on the inner box 126, the burner portion of which heating device projects into close proximity to the foot-rest and is arranged in such manner as to direct the flame upon and about the foot.

Figure 27:
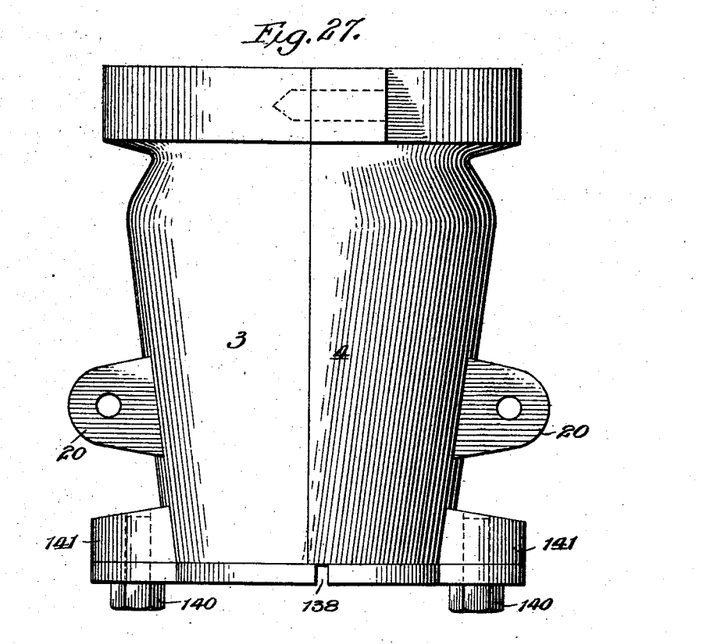
Fig. 27 is a view in elevation of a divided mold, adapted for use in the machine for the formation of articles not requiring a stand or foot.
Figure 28:
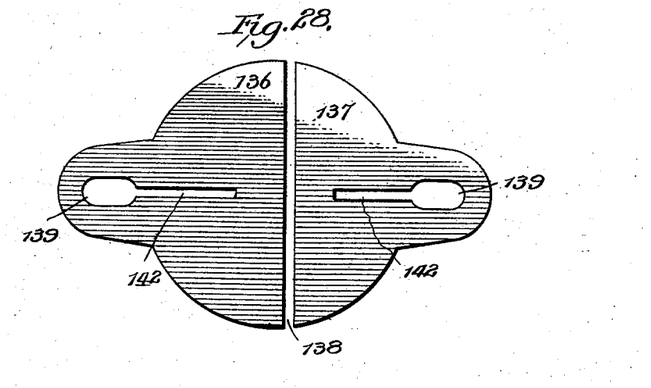
Fig. 28 is a bottom view of the detached sections composing the bottom of the mold illustrated in Fig. 27.

In Figs. 27 and 28 is shown in detail the preferred construction of the divided mold, the particular object of which is to prevent the formation of a rough extension or gathering of glass on the bottom of the completed article, occurring by reason of the line of the mold's division crossing the center of the article and at the axis of its rotation. The mold in this construction is provided with a divided bottom comprising sections 136 and 137, having the line 138 of their meeting or adjoining edges at one side of the center of the mold. The sections of the bottom are preferably formed separately from the mold-sections, and when so formed are provided with a slot 139, in which work the set-screws 140, by which the bottom sections are firmly secured to the mold-sections by entering screw-threaded openings in lugs 141, formed on the mold-sections. Leading from the slot 139 is an elongated opening 142, by which the mold is drained of any water.

As before mentioned, the machine illustrated in Fig. 1 is double, each side being independent of the other as far as its individual working is concerned; but the construction shown is desirable by virtue of the advantages secured by the coöperative effect of these standards, the large base providing a large single water-pan and the driving of the pulley of one side from the driven pulley of the other, this latter object being effected by means of the rawhide strap shown in the drawings connecting the two pulleys.

Having thus described my invention, what I claim, and desire to secure by Letters Patent, is—

1. In a machine for forming glass articles, the combination with the mechanically-operated mold-sections, of a blowpipe, means for supporting the same, means for imparting to said blowpipe a rotary movement, and an air-conduit adapted to automatically lower on and raise from the blowpipe after the placing of said blowpipe in its operative position in the machine, substantially as specified.

2. In a machine for forming glass articles, the combination with the mold-sections, of a blowpipe, an air-conduit, and means for automatically opening and closing the mold-sections, rotating the blowpipe, and coupling and uncoupling the air-conduit, said means comprising a lever suitably connected with the mold-sections, a lever connected with the air-conduit, and a driven shaft having assembled thereon and operating therewith, a cam for imparting a periodic movement to the said mold-operating lever, a wheel adapted to rotate the blowpipe, and a segment or cam for engaging and operating the lever for raising and lowering the air-conduit, substantially as and for the purpose set forth.

3. In a machine for forming glass articles, the combination with the mold-sections, of a blowpipe, means for supporting the same in operative position to the said mold-sections, an air-conduit adapted to be lowered onto the blowpipe and raised therefrom during the operation of the machine, a lever for operating said air-conduit, a lever for operating the mold-sections, a shaft carrying means, substantially as described, for operating said levers and rotating the blowpipe, and a clutch mechanism carried by said shaft for imparting an intermittent movement thereto and adapted to be automatically thrown into engagement with a constantly-driven shaft by the introduction of the blowpipe, and automatically thrown out of engagement with said constantly-driven shaft upon the completion of each revolution of the shaft carrying the clutch, substantially as set forth.

4. In a machine for forming glass articles, the combination with the rotatable blowpipe, air-conduit, and means for operating the same, of a two-part mold having the sections thereof mounted upon pivoted operating-arms, a spring-yoke connecting said operating-arms, a reciprocatory rod connecting said spring-yoke, a lever for reciprocating said rod, and a rotatable shaft, and a cam mounted on said shaft adapted to impart an intermittent movement to said lever, substantially as set forth.

5. In a machine for forming glass articles, the combination with the mold formed in sections, means for operating the same, and an air-conduit, of a removable blowpipe adapted to be supported in operative position relative to said mold and air-conduit, means for automatically imparting rotation to said blowpipe, the same comprising a gear-wheel carried by a rotatable shaft, and a pinion carried by said blowpipe and adapted to be engaged by said gear, substantially as set forth.

6. In a machine for forming glass articles, the combination with the mold formed in sections, means for operating the same, and a blowpipe supported in operative position to the mold, of an air-conduit and means for automatically lowering and raising the said conduit, the same comprising a lever to which said air-pipe is connected, and a rotatable shaft carrying a cam for imparting to said lever an intermittent movement, whereby to raise the air-conduit and permit it to descend by gravity at the proper point of the machine's operation, substantially as set forth.

7. In a machine for forming glass articles, the combination with the two-part mold and its operating means, a removable blowpipe, an air-conduit, and their operating means, of a rotatable shaft carrying mechanism for automatically opening and closing the mold, rotating said blowpipe, and coupling and uncoupling the air-pipe, and a clutch mechanism comprising a constantly-driven pulley, a locking pin or bolt vertically movable in a support carried by the said rotatable shaft, a sliding block in which said pin is mounted, means such as a spring, for normally exerting a pressure to keep the pin in engagement with the said pulley, and a stationary projection having a cam-face, arranged in the path of the said sliding block, whereby to force it down against the pressure of said spring and release the pin from its engagement with said constantly-driven pulley, substantially as set forth.

8. In a machine for forming glass articles, the combination with the two-part mold having each section thereof carried by a pivoted operating-arm, a spring-yoke connecting said arms, a vertically-reciprocatory rod connected to said yoke and operating to open and close the sections of the mold through the same, a lever to which said rod is connected, a rotatable shaft having mounted thereon a cam, whereby, as the said shaft rotates, the said lever will be acted on by the cam and movement imparted to the rod for opening and closing the mold, substantially as set forth.

9. In a machine for forming glass articles, the combination with the two-part mold having each section carried by pivoted arms or levers, an operating-rod suitably connected thereto, and a lever for reciprocating said rod, of a blowpipe carrying a pinion, adapted to be supported in operative position to said mold, a rotatable shaft, a gear carried thereby adapted to mesh with the blowpipe-pinion, and a cam carried by said gear, and adapted to engage the lever for reciprocating said mold-operating rod, substantially as set forth.

10. In a machine for forming glass articles, the combination with the two-part mold, of a lever, a rod connected thereto and to the mold-sections, and a cam carried by a rotatable shaft, for operating upon the lever, said cam having a vertical face for raising the mold-sections to a position to receive the gathering of glass, an engaging face lying in a horizontal plane, whereby the sections are held against further movement at that point, an inclined face for bringing the mold-sections together through the agency of the lever operated upon thereby, and a segmental track portion lying in a horizontal plane, adapted to hold said lever in the position assumed when the mold is closed and during the time said segmental portion is traveling over the engaged lever, substantially as set forth.

11. In a machine for molding glass articles, having the mold-sections of which adapted to dip into a cooling-tank, and having a blowpipe held in operative position to said mold, the combination of a rod for operating the mold-sections, a lever for reciprocating said rod, a pinion carried by said blowpipe, a main operating-shaft carrying a mutilated gear-wheel, adapted to rotate said blowpipe during a part of the shaft's rotation, and a cam carried by said gear, adapted to engage said lever and through it raise the mold-sections, bring them into a closed position and hold them closed, said cam being so arranged upon the mutilated gear as to allow the mold-sections to open slightly after the rotation of the blowpipe ceases, and to raise the sections to the position in which they receive the gathering of glass, before there is rotation of the blowpipe, substantially as set forth.

12. In a machine for forming glass articles, the combination with pivoted mold-operating arms, of a divided mold, the sections of which are pivotally mounted upon said arms, respectively, whereby the sections are adapted to turn upon their pivots in a vertical plane during the operation of the machine, and means for opening and closing the mold, as and for the purpose set forth.

13. In a machine for forming glass articles, the combination with a tank, of a sectional mold, pivoted arms carrying the mold-sections and formed with a bend whereby they are adapted to straddle the wall of the tank, and dip the mold-sections into the tank, and means for operating the said arms, substantially as set forth.

14. In a machine for forming glass articles, the combination with a tank, of a sectional mold, pivoted arms carrying the mold-sections, the same having a hooked portion for straddling the wall of the tank, and an extension formed at the end of said hook portion adapted to project over the tank at all times, and means for operating the arms, substantially as set forth.

15. In a machine for forming glass articles, the combination with the tank having a depression in the side wall thereof, of a two-part mold, pivoted arms supporting the same, working in said depression, and means for operating the said arms, substantially as set forth.

16. In a machine for forming glass articles, the combination with the pivoted arms, of a mold-section carried by each arm, and means intermediate the sections and the arms, for adjusting said sections relatively to each other and to the arms, substantially as set forth.

17. In a machine for forming glass articles, the combination with a tank, of a two-part mold, pivoted arms carrying the sections of mold, a spring-yoke connecting said arms, adapted to normally exert a pressure to bring the mold-sections together, a rod connected to said yoke for operating the mold-sections, means for raising said rod, and means for normally exerting the power to force said rod down after it has been raised, whereby the mold-sections may be actuated by gravity in their dipping movement, substantially as set forth.

18. In a machine for forming glass articles, the combination with a tank and the mold-sections adapted to dip therein, of a water-tight chamber extending down into said tank, and having supported therein a foot-rest, substantially as set forth.

19. In a machine for forming glass articles, the combination with the tank and the mold-sections adapted to dip therein, of a water-tight chamber extending down into the tank, a foot-rest supported in said chamber and operating in conjunction with the mold, and a burner, substantially as described, whereby the foot of the article being formed and the foot-rest are kept heated.

20. In a machine for forming glass articles, the combination with the mechanically-operated mold-sections, a blowpipe, means for rotating the same, and an air-conduit, of a horizontally-movable coupling carried by said air-conduit, said coupling consisting of a rigid bearing attached to and projecting laterally from the end of the conduit, and a mouth-piece movable thereon, adapted to receive the end of the blowpipe, as and for the purpose set forth.

21. In a machine for forming glass articles comprising mold-sections, a blowpipe, an air-conduit, and means for automatically operating the said specified parts, of the horizontally-movable coupling consisting of a flanged disk and an inclosing portion adapted to slide thereon, having formed therein an opening for the reception of the blowpipe, substantially as set forth.

In testimony whereof I hereunto affix my signature in the presence of two witnesses.

HENRY L. REINHARDT.

Witnesses:
A. J. WILSON,
E. BACHMANN.